United States Patent [19]

Napier et al.

[11] Patent Number: 4,814,091

[45] Date of Patent: Mar. 21, 1989

[54] PROCESS FOR REMOVING METALS FROM WATER

[75] Inventors: John M. Napier; Charles M. Hancher, both of Oak Ridge; Gail D. Hackett, Knoxville, all of Tenn.

[73] Assignee: The United States of America as represented by the United States Department of Energy, Washington, D.C.

[21] Appl. No.: 67,073

[22] Filed: Jun. 29, 1987

[51] Int. Cl.$^4$ .............................................. C02F 1/62
[52] U.S. Cl. .................................... 210/665; 210/669; 210/718; 210/725; 210/806; 210/912; 210/914
[58] Field of Search ................................ 210/912–914, 210/663, 665, 669, 688, 709, 718, 719, 724, 725, 728, 732–736, 739, 750, 757, 768, 800, 804, 806, 921

[56] References Cited

U.S. PATENT DOCUMENTS

| | | | |
|---|---|---|---|
| 3,749,761 | 7/1973 | Dean et al. | 210/914 X |
| 3,790,370 | 2/1974 | Lalancette | 210/665 X |
| 4,005,009 | 1/1977 | Kinoshita et al. | 210/914 X |
| 4,147,626 | 4/1979 | Findlay et al. | 210/914 X |
| 4,364,773 | 12/1982 | Veronneau et al. | 210/913 X |
| 4,420,401 | 12/1983 | Kretas et al. | 210/912 X |
| 4,422,943 | 12/1983 | Fender et al. | 210/914 X |
| 4,432,880 | 2/1984 | Talbot | 210/912 X |
| 4,566,975 | 1/1986 | Allgulin | 210/912 X |
| 4,614,592 | 9/1986 | Googin et al. | 210/914 X |
| 4,624,790 | 11/1986 | Kamperman et al. | 210/724 X |

*Primary Examiner*—Tom Wyse
*Attorney, Agent, or Firm*—Stephen D. Hamel; Judson R. Hightower

[57] ABSTRACT

A process for removing metals from water including the steps of prefiltering solids from the water, adjusting the pH to between about 2 and 3, reducing the amount of dissolved oxygen in the water, increasing the pH to between about 6 and 8, adding water-soluble sulfide to precipitate insoluble sulfide- and hydroxide-forming metals, adding a flocculating agent, separating precipitate-containing floc, and postfiltering the resultant solution. The postfiltered solution may optionally be eluted through an ion exchange resin to remove residual metal ions.

30 Claims, No Drawings

PROCESS FOR REMOVING METALS FROM WATER

The invention was made in the course of contract number DE-AC05-840R21400 with the Department of Energy.

BACKGROUND OF THE INVENTION

1. Field of the Invention

This invention relates to a process for removing metals from water. In particular, this invention relates to a process for removing metals from water such that the processed water can meet the requirements for discharge into a natural stream.

2. Description of the Prior Art

Metals, such as mercury, lead, chromium, cadmium, silver, zinc and copper, can contaminate ground water when emitted in waste water from industrial buildings or in coal pile runoff from a steam plant. Since such metal-contaminated runoff from industrial processes frequently constitutes a considerable amount of water, an economical process is needed for removing such metals from waste water. Such a process could be useful in industry for treating water from coal washers, coal mines, steel mills and other industries having waste water contaminated with metallic ions in amounts exceeding environmentally safe levels.

Attempts to treat metal-contaminated waste water using ion exchange resin processes have not been as economical or efficient as desired due to the relatively high levels of metal contaminants which tend to decrease the absorption capacity and consequently the useful life of the ion exchange resin. There is a need for an improved process for removing metallic ions from waste water. There is also a need for a way to optimize the efficiency of an ion exchange resin process for removing metals from waste water on an industrial scale.

SUMMARY OF THE INVENTION

It is therefore an object of the present invention to provide a process for removing metals from waste water.

It is also an object of the present invention to provide a process capable of removing metal contaminants such as mercury, lead, chromium, cadmium, silver, zinc and copper from waste water.

Another object of the present invention is to provide a process for removing metal contaminants from waste water such that the waste water can meet environmental requirements for discharge into a natural stream.

It is still another object of the present invention to provide an economical process for reducing the mercury content of water to less than about 2 ppb.

Yet another object of the present invention is to provide an economical and efficient process for reducing the metallic ion content of water preparatory to treatment with an ion exchange resin.

In accordance with one aspect of the present invention, these objects are achieved by providing a process for removing sulfide-precipitable metals from water comprising the steps of:

(a) filtering solids from the water;
(b) adding a soluble sulfide to the water to co-precipitate water-insoluble metal sulfides and hydroxides;
(c) flocculating precipitated metal sulfides and hydroxides with a flocculating agent;
(d) separating flocculated precipitates from the water; and
(e) filtering water recovered from step d) to remove residual solids.

Other objects, features and advantages of the present invention will become apparent from the following detailed description.

DETAILED DESCRIPTION OF THE PREFERRED EMBODIMENTS

The present invention is a process for removing metals from water. The metal-contaminated water is first passed through a coarse filtering or prefiltering operation in which solid material and a portion of the metals contaminating the water are removed. The prefiltering operation can be accomplished by a diatomite or a similar microfiltering apparatus. Filters ranging in filter size from submicron size up to about 100 microns or more, particularly between about 0.7 to about 50 microns, may be used. Typically, the filters are set up in a grade down sequence in which the filters are arranged in series in order of decreasing size. For example, between 50 and 90% of the insoluble mercury in mercury-contaminated water can be removed with a one-micron filter.

The pH of the filtered water is then adjusted to a value within a range from about 2 to about 3. The pH reduction can be accomplished by the addition of an acid such as sulfuric acid. The amount of dissolved oxygen in the water is then reduced prior to the precipitation phase of the process. Excessive amounts of dissolved oxygen in the water can inhibit removal of metals such as mercury. Consequently, it is desirable to reduce the amount of dissolved oxygen in the water to a level of less then about 4000 parts per billion. About 2,000 ppb of ferrous sulfate and about 2,000 ppb of ferric sulfate are added to the water to reduce the amount of dissolved oxygen. Amounts of sulfate in the water up to about 40,000 ppb can be tolerated in the process. The ferrous ions are converted to ferric ions by reaction with the dissolved oxygen. Ferric ions are relatively stable and do not react with dissolved mercurous ions.

The ferric ions are more desirable for forming an acceptable floc than the ferrous ions. Satisfactory results are obtained by using a mixture of both ferric and ferrous ions.

After dissolved oxygen has been reduced, the pH of the water is then increased to a value from about 6 to about 8. The pH can be increased by the addition of any base. Calcium hydroxide is preferred because precipitates formed by the addition of calcium ions usually settle more quickly than ones formed by other caustic compounds.

Sulfide-forming metals are precipitated from the solution by the addition of a water-soluble sulfide, e.g. an alkali metal sulfide such as sodium sulfide. Preferably, the pH value is maintained in the range from about 6 to about 8, although lower and higher pH values can be tolerated. The molar amount of sulfide should at least equal the amount of metal ions to be removed. Preferably a slight excess of sulfide will be present. The use of an excessive amount of sodium sulfide should be avoided. Large excess amounts of sodium sulfide in the water can form water-soluble mercury sulfide complexes which inhibit removal of mercury by the present process. Preferably, the optimal removal of mercury is accomplished by a sodium sulfide content that does not exceed the mercury content by more than one order of magnitude. Additionally, excessive sodium sulfide could exceed the amount of sulfide permitted in water discharge into natural streams.

A flocculation agent is added to the solution forming a floc which sorbs the sulfide-forming and hydroxide-forming metal precipitates. Conventional organic polyelectrolytes or anionic-cationic polymer flocculation agents can be used. Numerous such materials are commercially available. Amounts of flocculation agent between about 1,000 and about 5,000 ppb are ordinarily sufficient.

The precipitate-containing floc is then permitted to settle in the water. During this process, the ferric and ferrous ions, and other metal ions form insoluble hydroxide and sulfide salts. The mercury ions are converted to mercury sulfide. The resulting floc contains a mixture of hydroxides and sulfides of iron and metal contaminants, such as mercury, lead, chromium, cadmium, silver, zinc and copper. The precipitates sorbed by the floc are allowed to settle. The settled precipitate-containing floc is removed from the solution.

The resultant water may thereafter be passed through a postfiltering operation. The postfiltering operation includes a diatomite microfiltering grade down system in which a filter size in the range between 0.7 to 50 microns is used. Preferably, the postfiltering operation is effected using at least one filter having a nominal pore size of not more than one micron. The water passing through the filters meets the requirements for discharge into a natural stream. Specifically, the postfiltered water contains less than about 2 ppb of mercury.

Optionally, the removed precipitate-containing floc can be dewatered and the resulting water can be recycled through the entire process.

In a desirable embodiment, the process can be combined with the ion exchange resin process of U.S. Pat. No. 4,614,592. In this embodiment, the postfiltered solution is eluted through at least one ion exchange resin. The ion exchange resin further reduces the metal ion content of the water. The useful life of the modified ion exchange resin is significantly extended by using the present process for reducing the mercury content of the water prior to elution through the modified ion exchange resin.

When using the ion exchange resin process, the pH value of the water must be maintained at a value ranging between about 5 and about 9. The useful life of the modified ion exchange resin is decreased at pH values less than 5, and will not function as designed at pH values greater than 9 because the mercury cannot attach to the resin.

The process of the invention may be carried out either batch-wise or continuously. In either case, the general process steps are substantially the same. In continuous operation, after addition of the sulfide and the flocculation agent, the solution is passed at a predetermined rate through a reactor-clarifier vessel and the precipitate-containing floc is allowed to settle to the bottom of the vessel. The water retention time in the reactor-clarifier may vary from about one-half hour up to about three hours or more. Good results have been obtained when the flow rate is adjusted preferably to provide a water retention time within the reactor-clarifier vessel of about 90 minutes. The settled precipitate-containing floc may be withdrawn either intermittently or continuously from the bottom of the reactor-clarifier vessel. The effluent from the vessel is then pumped through a postfiltering apparatus.

The invention will be illustrated in further detail by the following, non-limiting examples.

EXAMPLE I

Approximately 92,000 gallons of water from a storage tank were treated by the process of the present invention. The water in the storage tank was drinking water that had been contaminated with mercury when lines were accidentally broken.

The water was first pumped from the storage tank at a rate of 38 liters per minute (10 gallons per minute) through a prefilter comprising plate-and-frame filter press precoated with diatomite, and through a 50 micron cartridge filter into a 3,800 liter (1,000 gallon) storage tank. In this prefiltering operation, 95 percent of the mercury in the water was removed. The mercury concentration was reduced from an average value of 45.6 micrograms per liter (ppb) in the water in the storage tank, to an average value of 2.0 micrograms per liter in the filtered water.

The prefiltered water was then pumped from the 3,800 liter storage tank into a first 210 liter (55 gallon) drum. The pH of the water was lowered to a value of 2.5 with 5 weight percent sulfuric acid. A solution of 0.1 gram per liter ferric sulfate and 0.1 gram per liter ferrous sulfate was then added to the first drum of water until the total concentration of ferric sulfate and ferrous sulfate in the drum of water was about 4,000 ppb.

Effluent from the first drum was then transferred into a second 210 liter drum and the pH of the effluent was raised to a value of 6 with a 5 weight percent slurry of calcium hydroxide. The slurry of calcium hydroxide also contained 0.1 milligrams per liter (ppm) of sodium sulfide, which decreased the solubility of the mercury compounds in the water. One thousand ppb of anionic-cationic polymer was added. The effluent from the second drum was pumped into a 3,400 liter (900 gallon) reactor-clarifier vessel. The flocculent settled to the bottom of the reactor-clarifier vessel for removal and the effluent was pumped from the top of the vessel through a diatomite filter and a 15 micron cartridge filter. The data for Example I are listed in Table I.

The average mercury concentration of the effluent from the reactor-clarifier vessel was 0.55 micrograms per liter (ppb). The average mercury concentration for the filtered water from the effluent of the reactor-clarifier vessel was 0.54 micrograms per liter (ppb). The processed water was discharged into a natural stream in 5 batches.

TABLE I

| | Mercury (ppb) | |
|---|---|---|
| | Average | Standard Deviation |
| Feed | 46.5 | 45.1 |
| After Prefiltration | 2 | 0.7 |
| After Precipitation/ Clarification | 0.55 | |
| After Final Filtration | 0.54 | 0.16 |

EXAMPLE II

Approximately 10,000 gallons of waste water from the manufacture of a modified ion exchange resin which had been contaminated with mercury were treated by the process of the invention. The feed water contained sodium sulfate, ferrous sulfate and sodium sulfide.

The processed water in the reactor-clarifier vessel contained 36 ppm of ferrous ions; 7.7 ppm of ferric ions; and 0.0185 ppm of sulfide ion. The water from the final filtering operation was processed through the modified ion exchange resin described in U.S. Pat. No. 4,614,592. Approximately 2,500 gallons of water were processed through 1 cubic foot of the modified ion exchange resin. The resulting data for Example II are listed in Table II.

TABLE II

|  | Average | No. of Data Points | Maximum | Minimum |
|---|---|---|---|---|
| Feed | 29.6 | 37 | 62 | 0.8 |
| Filter | 24 | 37 | 58 | 1.8 |
| Reactor Clarifier Filter | 4.9 | 33 | 13 | 0.8 |
| Resin Columns (arranged in parallel) | | | | |
| No. 1 | 1.0 | 37 | 4.2 | <0.5 |
| No. 2 | 1.2 | 37 | 15.0 | <0.5 |
| No. 3 | 0.98 | 36 | 5.8 | <0.5 |
| No. 4 | 0.96 | 36 | 2.9 | 0.6 |

The foregoing description has been set forth merely to illustrate the invention and is not intended to be limiting. Since modifications of the described embodiments incorporating the spirit and substance of the invention may occur to persons skilled in the art, the scope of the invention should be construed to include everything embraced by the appended claims and equivalents.

What is claimed is:

1. A process for removing sulfide-precipitable metals from water comprising the steps of:
   (a) filtering solids from the water;
   (b) adding a soluble sulfide to the water to co-precipitate water-insoluble metal sulfides and hydroxides;
   (c) flocculating precipitated metal sulfides and hydroxides with a flocculating agent;
   (d) separating flocculated precipitates from the water; and
   (e) filtering water recovered from step (d) to remove residual solids.

2. A process according to claim 1, wherein said water soluble sulfide is sodium sulfide.

3. A process according to claim 1, wherein said separating step is effected by settling the flocculated precipitates in a clarifier.

4. A process according to claim 1, wherein filtered water from step (a) is treated with a reducing agent to reduce dissolved oxygen prior to addition of soluble sulfide in step (b).

5. A process according to claim 4, wherein said treatment with a reducing agent is effected at a pH of from about 2 to about 3.

6. A process according to claim 4, wherein said reducing agent comprises ferrous ions oxidizable to ferric ions.

7. A process according to claim 6, wherein said reducing agent comprises a mixture of ferrous sulfate and ferric sulfate.

8. A process according to claim 7, wherein the sulfate content of the treated water is less than 40,000 parts per billion.

9. A process according to claim 4, wherein after treatment with the reducing agent, the pH of the water is adjusted to a value in the range from about pH 6 to about pH 8 prior to addition of soluble sulfide.

10. A process according to claim 1, wherein the amount of soluble sulfide added in step (b) is less than one order of magnitude greater than the sulfide precipitable metal content of the water.

11. A process according to claim 1, wherein said sulfide precipitable metal is at least one member of the group consisting of mercury, lead, chromium, cadmium, silver, zinc and copper.

12. A process according to claim 11, wherein said metal comprises mercury, whereby between 50 and 90% of insoluble mercury is removed.

13. A process according to claim 1, wherein water recovered from step (e) is post-treated with an ion exchange resin to remove residual metal ions.

14. A process according to claim 9, wherein the pH of the water is adjusted to a value in the range from about pH 6 to about pH 8 by addition of calcium hydroxide.

15. A process according to claim 1, wherein the amount of soluble sulfide added in step (b) is less than 10,000 parts per billion.

16. A process according to claim 3, wherein the flow rate of treated water to the clarifier is controlled to provide a nominal retention time of from about one-half hour to about three hours in the clarifier.

17. A process according to claim 16, wherein the flow rate of treated water to the clarifier is controlled to provide a nominal retention time of about one and one-half hours in the clarifier.

18. A process according to claim 2, wherein said filtering step e) is effected with at least one filter having a nominal pore size not larger than one micron.

19. A process according to claim 1, wherein floc separated from the water in step (d) is dewatered, and water recovered from the dewatering step is recycled through the process.

20. A process according to claim 1, wherein said flocculating agent comprises an anionic-cationic polymer.

21. A process according to claim 20, wherein said flocculating agent is added in an amount providing a flocculating agent concentration in the range from about 1,000 and 5,000 parts per billion.

22. A process according to claim 1, wherein said filtration is step (a) is effected with at least one filter having a nominal pore size in the range from about 100 microns to about 1 micron.

23. A process according to claim 1, wherein water being treated flows continuously through a plurality of successive treatment stations in which steps of the treatment process are effected.

24. A process according to claim 12, wherein the water is treated to a mercury content of less than 2 parts per billion.

25. A process for removing sulfide-precipitable metals from water comprising the steps of:
   (a) passing water contaminated with a metal selected from the group consisting of mercury, lead, chromium, cadmium, silver, zinc and copper through at least one filter so as to remove between about 50 to 90% of any mercury present in said water;
   (b) adding a soluble sulfide to the water to co-precipitate water-insoluble metal sulfides and hydroxides;
   (c) flocculating precipitated metal sulfides and hydroxides with a flocculating agent;
   (d) separating flocculated precipitates from the water; and
   (e) filtering water recovered from step (d) to remove residual solids.

26. A process for removing sulfide-precipitate metals in accordance with claim 25, wherein said at least one filter has a filter size ranging from submicron size up to about 100 microns.

27. A process for removing sulfide-precipitate metals in accordance with claim 26, wherein said at least one filter comprises a plurality of filters set up in a downgrade sequence in which said filters are arranged in series in order to decreasing size.

28. A process for removing sulfide-precipitate metals in accordance with claim 26, wherein said filter size is between about 0.7 to about 50 microns.

29. A process for removing sulfide-precipitate metals in accordance with claim 28, wherein at least one of said at least one filter has a filter size of about one micron.

30. A process for removing sulfide-precipitate metals in accordance with claim 29, wherein said metal comprises mercury.

* * * * *